United States Patent

Taylor

[15] 3,661,213

[45] May 9, 1972

[54] AGRICULTURAL APPARATUS FOR SHAPED BEDS

[72] Inventor: Clyde L. Taylor, 1545 South Chinowith Road, Visalia, Calif. 93277

[22] Filed: Mar. 19, 1970

[21] Appl. No.: 19,544

Related U.S. Application Data

[63] Continuation of Ser. No. 716,577, Mar. 27, 1968, abandoned.

[52] U.S. Cl. .............................. 172/72, 172/112, 172/123, 172/145, 172/540, 111/6, 111/10
[51] Int. Cl. .................................. A01b 33/02, A01b 33/16
[58] Field of Search .................. 111/6, 10; 172/78, 112, 122, 172/123, 157

[56] References Cited

UNITED STATES PATENTS

| | | | |
|---|---|---|---|
| 1,662,088 | 3/1928 | Raussendorff | 172/112 |
| 2,644,386 | 7/1953 | Sutton | 172/78 |
| 2,739,517 | 3/1956 | Roberts | 172/112 |
| 3,409,088 | 11/1968 | Lindbeck et al. | 172/78 |
| 2,754,744 | 7/1956 | Hall | 172/556 |
| 3,029,879 | 4/1962 | Wells | 172/78 |
| 3,151,685 | 10/1964 | Field | 172/556 |
| 3,316,865 | 5/1967 | Williams | 111/6 |
| 3,347,188 | 10/1967 | Richey | 111/10 |
| 3,235,012 | 2/1966 | Johnson et al. | 172/157 |
| 907,509 | 12/1908 | Kramer | 172/556 |
| 2,199,954 | 5/1940 | Kelsey | 172/548 X |
| 2,754,744 | 7/1956 | Hall | 172/112 X |
| 3,029,879 | 4/1962 | Wells | 172/112 X |
| 3,151,685 | 10/1964 | Field | 172/556 |
| 3,235,012 | 2/1966 | Johnson et al. | 172/157 |
| 3,316,865 | 5/1967 | Williams | 172/540 UX |
| 3,347,188 | 10/1967 | Richey | 172/112 X |

FOREIGN PATENTS OR APPLICATIONS

| | | |
|---|---|---|
| 660,157 | 2/1964 | Italy |
| 1,077,675 | 5/1954 | France |

Primary Examiner—Robert E. Pulfrey
Assistant Examiner—C. W. Hanor
Attorney—Flehr, Hohbach, Test, Albritton & Herbert

[57] ABSTRACT

Agricultural apparatus for shaped beds having a rotatable mulcher assembly adapted to engage the top surface of the bed and to break up the top surface of the bed to form a relatively fine mulch on the top of the bed and having a housing which overlies the bed and encloses the upper extremities of the mulcher assembly, the housing having an opening to the rear and means for enclosing the opening so that all the clods on the top surface of the bed cannot exit from the housing and are broken up or pulverized by the mulching assembly.

6 Claims, 4 Drawing Figures

INVENTOR.
Clyde L. Taylor

INVENTOR.
Clyde L. Taylor
BY Flehr, Hohbach, Test
Albritton & Herbert
Attorney

AGRICULTURAL APPARATUS FOR SHAPED BEDS

This application is a streamlined continuation of application Ser. No. 716,577 filed Mar. 27, 1968 now abandoned.

BACKGROUND OF THE INVENTION

There is disclosed in copending application Ser. No. 408,572, filed Nov. 3, 1964, now U.S. Pat. No. 3,538,987 an agricultural apparatus for shaped beds which utilizes an incorporator which engages the top surface of the bed which is utilized for incorporating additives into the bed and which also serves to break up the top surface of the bed. However, it has been found that these incorporators do not necessarily break up all the clods on the top of the bed so as to provide a relatively fine layer of soil at the top of the bed to serve as a mulch. There is, therefore, a need for a new and improved agricultural apparatus which will perform this function.

SUMMARY OF THE INVENTION AND OBJECTS

The mulcher apparatus for shaped beds consists of a framework which is adapted to be moved over the shaped beds. A shaft is rotatably mounted upon the framework and carries at least one rotatable mulcher assembly. Means is mounted on the framework for positively driving the shaft and the mulcher assemblies carried thereby so that the mulcher assemblies engage the top surface of the bed and break up the top surface of the bed and break up any clods on the top of the bed. A housing is provided for each of the mulcher assemblies and overlies the mulcher assemblies and substantially encloses the portions of the mulcher assemblies disposed above the top of the bed. The housing is provided with a rear exit opening and gate-like means for closing the opening and serving to prevent clods and the like on the top of the bed from exiting through the opening whereby they are retained within the housing and urged into the mulcher assembly so that the mulcher assembly breaks up all the clods and causes the top layer of soil to be formed into a relatively fine mulch on top of the bed.

In general, it is an object of the present invention to provide an agricultural apparatus for shaped beds which makes it possible to break up the top surface of the bed into relatively small particles so that a relatively fine mulch is formed on top of the bed.

Another object of the invention is to provide an agricultural apparatus of the above character in which the fineness of the mulch which is provided on the top of the bed can be adjusted.

Another object of the invention is to provide an agricultural apparatus of the above character which has a mulching assembly for the top surface of the bed that works the entire width of the top surface of the bed.

Another object of the invention is to provide an agricultural apparatus of the above character in which the adjustments can be readily made.

Additional objects and features of the invention will appear from the following description in which the preferred embodiment is set forth in detail in conjunction with the accompanying drawing.

DESCRIPTION OF THE PREFERRED EMBODIMENT

Figure 1:
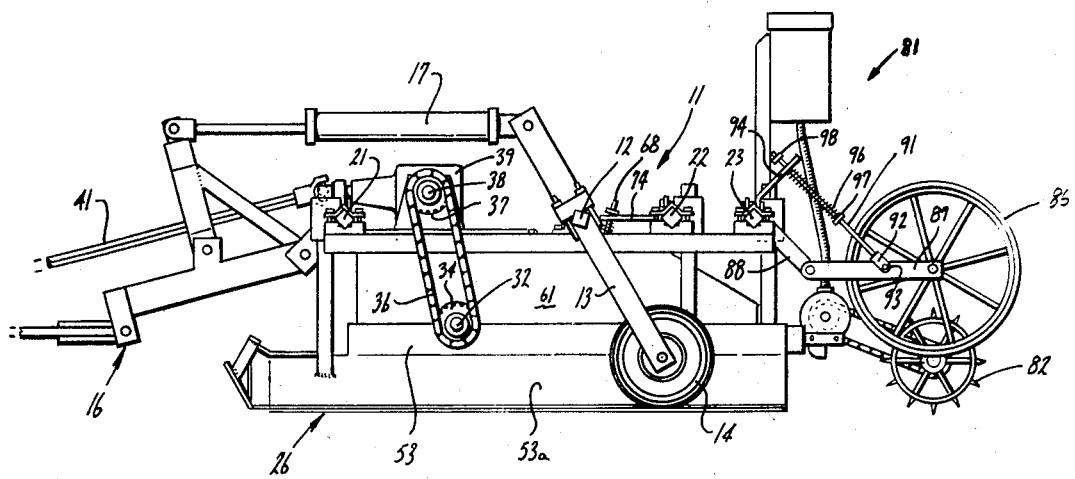
FIG. 1 is a side elevational view of an agricultural apparatus for shaped beds incorporating the present invention.

The agricultural apparatus for shaped beds consists of a framework 11 which in many respects is similar to the framework disclosed in application Ser. No. 408,572, filed Nov. 3, 1964. A member 12 is pivotally mounted upon the framework 11 and extends transversely of the framework 11. Support assemblies 13 are mounted upon the member 12 and carry rubber-tired ground engaging wheels 14. A hitch 16 is mounted on the framework 11 and is provided for connecting the apparatus to a tractor which can be utilized for moving the apparatus through the field. Means of a conventional type is provided which includes a hydraulic cylinder 17 for causing pivotal movement of the member 12 and for causing shifting of the wheels 14 relative to the framework 11 to cause the framework to be raised and lowered. A plurality of tool bars 21, 22 and 23 are mounted upon the framework 11 in a manner similar to that described in Ser. No. 408,572, filed on Nov. 3, 1964.

Figure 2:
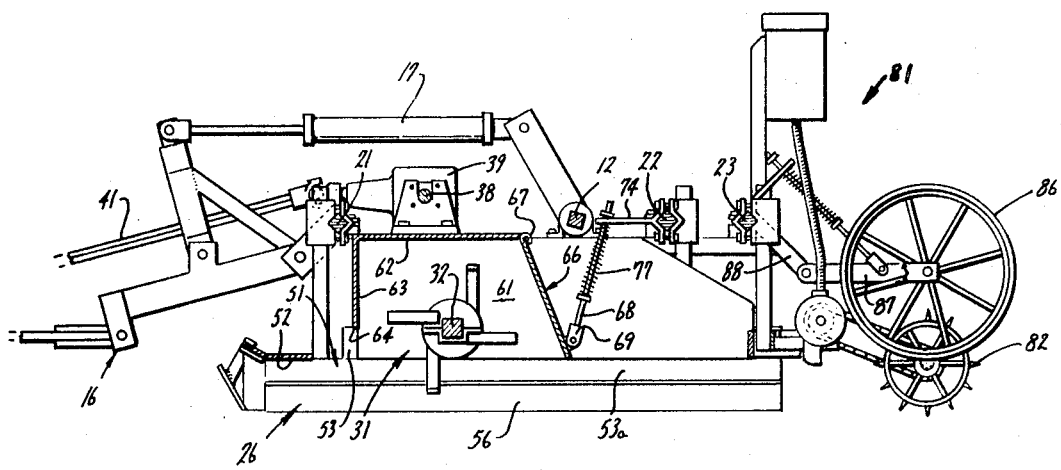
FIG. 2 is a cross-sectional view of the agricultural apparatus shown in FIG. 1 and particularly showing the incorporator or mulching assembly being utilized.

The agricultural apparatus is particularly adapted for use in preparing, planting and treating agricultural land which is to be irrigated. Thus, as disclosed in U.S. Pat. application Ser. No. 408,572, filed on Nov. 3, 1964, it includes a plurality of spaced bed shapers 26 which are mounted upon the framework 11 and extend longitudinally of the framework. The bed shapers 26 extend substantially the entire length of the framework 11 and are secured to the tool bars 21 and 22. As can be particularly seen from FIGS. 1 and 2, the forward extremities of the bed shapers are outwardly flared whereas the remainder of the bed shaper has a substantially uniform transverse cross-section extending the entire length of the bed shaper.

Means is provided between the forward and rear extremities of the bed shaper for mulching the top surface of the bed being formed by the bed shaper. By mulching is meant that the top surface of the bed is tilled so that the soil or earth which forms the top surface of the bed is broken up rather finely to provide a layer of mulch or top cover for the bed which is particularly suitable for planting operations and for retaining moisture within the soil. Such means consists of a mulching or incorporating assembly 31 provided for each of the bed shapers and being mounted upon and spaced longitudinally of a shaft 32. The shaft 32 is rotatably mounted upon the framework 11 and extends transversely of the framework. A housing assembly 33 is provided for each of the mulching or incorporating assemblies 31. The shaft 32 is in the form of a bar which is driven by a large sprocket 34 mounted thereon. The sprocket 34 is driven by a chain 36. The chain is driven by a sprocket 37. The sprocket 37 is mounted on a shaft 38 of a right angle gear unit 39. The gear unit 39 is driven by a power take-off shaft 41 which is adapted to be connected to the tractor which is to be utilized for pulling the agricultural apparatus.

Figure 3:
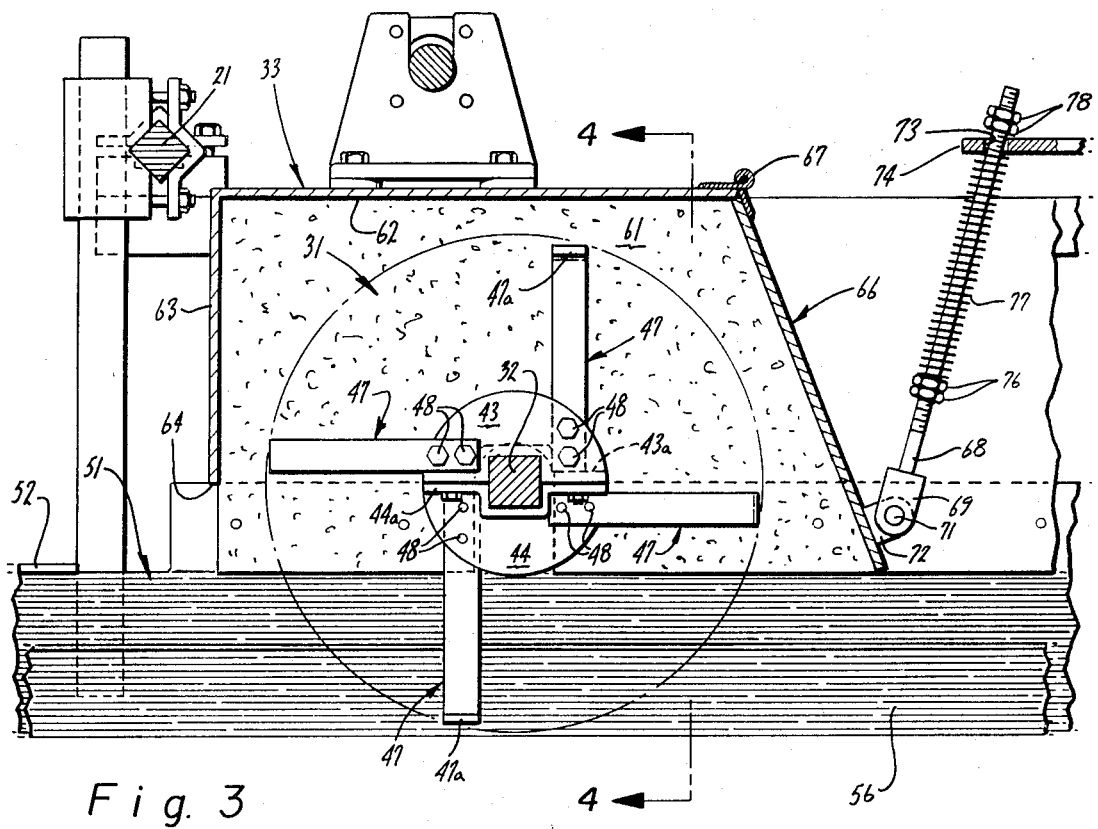
FIG. 3 is a partial enlarged view of a portion of the agricultural apparatus shown in FIG. 2 and particularly showing the incorporator or mulching assembly.
Figure 4:
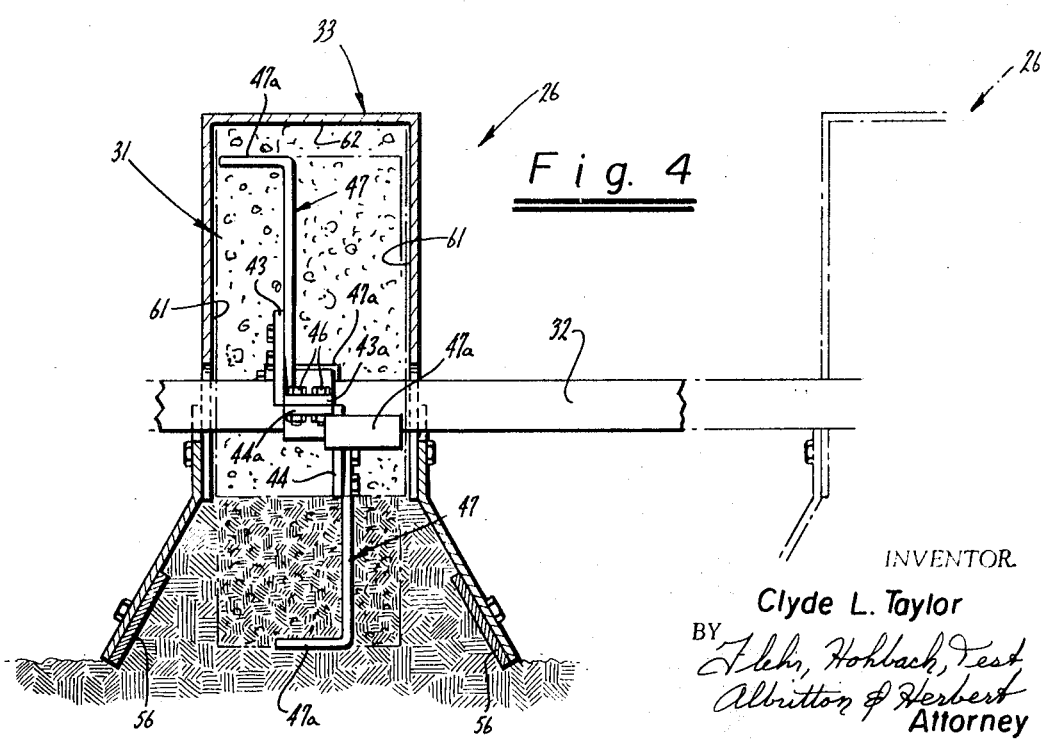
FIG. 4 is a cross-sectional view taken along the line 4-4 of FIG. 3.

The mulching or incorporating assemblies 31 consist of a pair of semi-circular plates 43 and 44 which are provided with hub-like portions 43a and 44a, respectively. As can be seen from FIG. 4, the plates 43 and 44 are arranged so that they extend in spaced vertical planes with the hub-like portions 43 and 44 being fastened together over the shaft 32 by bolts 46. A pair of tines or blades 47 are secured to each of the plates 43 and 44. The tines or blades, as can be seen from FIG. 4, are substantially L-shaped with the shorter leg portion 47a of each of the blades serving as the major cutting or incorporating element of the blade. The tines or blades 47 are secured to the plates by bolts 48 at spaced points on the plate so that they extend from the plate at angles approximately 90° with respect to each other. As can be seen particularly from FIGS. 3 and 4, one of the blades is mounted on one side of the plate, whereas the other of the blades of the same plate is mounted on the opposite side of the plate. It also can be seen that the shorter leg portions of the blades 47 for each of the plates extend in opposite directions. Thus, as viewed in FIG. 3, it can be seen that the four blades which are provided on the two plates 43 and 44 are spaced 90° apart with the ones being spaced 90° apart having their leg portions 47a extending in the same directions.

When the bed shapers 26 extend the entire length of the framework 11, the mulching and incorporating assemblies 31 are positioned intermediate the ends of the bed shapers and extend through an opening 51 provided in the top wall 52 of the bed shaper 26. As shown in FIG. 4, the shapers are also provided with vertical side walls 53 which are provided with downwardly and outwardly extending inclined portions 53a. As can be seen from FIG. 4, the side wall extensions 53a are provided with reinforcing members 56.

As can be seen from FIG. 4, the tines or blades 47 are arranged so that the tines or blades of a mulching assembly engage all lateral portions of the top layer of the bed which is formed by the bed shapers 26 because there are no dead spots between the tines or blades 47.

The housing 33 which is mounted over each of the mulching or incorporating assemblies 31 is substantially rectangular in cross-section as shown in FIG. 4 and is provided with vertical spaced, parallel side walls 61 extending the length of the bed shaper 26 and which are secured to the side walls 53 of the bed shapers. The housing is also provided with a top wall 62 and a front wall 63. The front wall 63 is dimensioned so as to provide an opening 64 which is normally above the top surface of the bed engaged by the bed shaper so that dirt and the like will not collect in front of the front wall as the agricultural apparatus is advanced in the field. The housing 33 is provided with a rear opening 64 to the rear of the mulching or incorporating assembly 31. This opening 64 is normally yieldably retained in a closed position by a gate or door 66 which has a length which is substantially greater than the space from the upper part of the opening to the top of the bed being shaped by the bed shaper. The gate 66 is hinged to the top wall 62 by a hinge 67 and has a length so that it is normally inclined outwardly and downwardly to the rear when the apparatus is in use. Means is provided for yieldably holding the gate or door 66 in a position so that it closes the opening 64 and consists of a threaded rod 68 which has one end mounted on a U-shaped member 69 pivotally connected by a pin 71 to an ear 72 provided on the lower extremity of the gate 66. The upper extremity of the rod 68 extends through a hole 73 provided in a member 74 mounted on the framework 11. A pair of nuts 76 are mounted on the end of the rod adjacent the U-shaped member 69 and have one end of a spring 77 engaging the same. The other end of the spring 77 engages the underside of the member 74. The rod 68 is retained within the hole 73 by a pair of nuts 78 mounted on the upper side of the member 74.

Additional equipment is mounted on the framework 11 as, for example, a plurality of planter assemblies 81 of a conventional type are mounted on the rear tool bar 23. As is well known to those skilled in the art, such planter assemblies include a toothed driving wheel 82 which is adapted to engage the top surface of the bed and which is provided for driving the planter. Means is provided for compacting the earth over the seeds as soon as they have been planted by the planter assemblies and consists of a plurality of wheels 86 which are spaced transversely of the framework 11 with one of the wheels being behind each of the planters provided on the framework 11. The wheels 86 are rotatably mounted on a bar 87 which is pivotally mounted upon a member 88 secured to the tool bar 23. Means is provided for yieldably urging each of the wheels 86 into firm engagement with the surface of the bed and includes a threaded rod 91 which has one end secured to a U-shaped member 92 pivotally connected by a pin 93 to the bar 87. The rod 91 extends through a hole (not shown) in a member 94 secured to the framework 11. A spring 96 is mounted on the rod and has one end engaging a stop nut 97 on the rod 91 and has the other end engaging the member 94. Another nut 98 is mounted on the other extremity of the rod for preventing the rod from dropping through the hole provided in the member 94.

Operation and use of the agricultural apparatus may now be briefly described as follows. Let it be assumed that the agricultural apparatus is connected to a suitable self-propelled vehicle such as a wheel-type tractor which is capable of pulling the agricultural apparatus through a field and at the same time supplying motive power through the power take-off drive shaft 41. As the unit is advanced through the field, the bed shapers 26 form the beds much in the same manner as described in application Ser. No. 408,572, filed Nov. 3, 1964. As described therein, the beds have generally planar top surfaces and outwardly inclined side walls. During the time that the beds are being formed, the mulching or incorporating assemblies 31 are being positively driven through the power take-off drive shaft 41 to cause rotation of the tines or blades 47 into the top surface of the beds to progressively break up the top surface of the bed as the agricultural apparatus is advanced. In order to ensure that the top surface of the bed is broken up into relatively fine particles so as to provide a mulch-type cover for the top of the bed, the gate 66 is positioned to yieldably close the opening 6 provided in the housing 33 so as to prevent any large clods or the like from escaping underneath the bottom of the gate 66. This is accomplished by adjusting the nuts 76 and 78 so that the desired amount of spring pressure is applied to the bottom of the gate 66 to hold the gate in the desired position. By yieldably holding the gate in this position, any large clods and the like which are on top of the bed are retained within the housing 33 and are progressively re-worked by the mulching or incorporating assemblies 31 until they are broken up into relatively fine particles. By holding the gate 66 in this closed position, it has been found that when the beds being planted have many clods, that substantially the entire housing becomes filled with clods and the clods are continuously recirculated within the housing by the rotation of the mulching or incorporating assemblies until they are broken up and pulverized. Thus, it has been found that the housing can be readily filled with clods to levels such as shown in FIG. 3 and still operate very satisfactorily. The clods cannot escape forwardly through the opening 64 because the agricultural apparatus is being continuously advanced through the field by the tractor. The arrangement of the tines or blades 46 on the mulching or incorporating assemblies is such that all lateral areas within the housing are covered by the portions 47a so that there is no dead space between the blades through which clods can escape.

It has been found that the agricultural apparatus is particularly efficacious for the preparation of the upper surface of the beds for planting because the soil which forms the bed is broken up into fine particles through which the planter can readily travel and in which very small seeds as, for example, sugar beet seeds can be deposited and grown. As soon as they have been deposited by the planter, the wheel 86 travels over the top and compresses the finely divided soil over the beet seed to provide an excellent bed for the growth of the seeds.

It is apparent from the foregoing that there has been provided a new and improved agricultural apparatus for shaped beds which is particularly useful for the preparation of the beds for planting and other operations such as incorporation of herbicides. The degree of breaking up of the top surface of the beds by the mulching or incorporating assemblies can be regulated by adjusting the speed of travel of the mulching or incorporating assemblies and also primarily by the adjustment of the rear gate to prevent any clods above a predetermined size from passing from the bed shapers. If it is desired to decrease the fineness to which the soil is being pulverized, it is merely necessary to loosen the nuts 76 and 78 to decrease the compression forces applied by the spring 77. The apparatus is constructed in such a manner that the compression forces applied by the spring 77 can be readily adjusted in the field. In addition, the teeth or tines are secured in such a manner that they also can be readily replaced when necessary.

I claim:

1. In an agricultural apparatus for shaped beds formed in the ground in a field, a framework, means supporting the framework to permit movement of the framework through the field, bed shaping means carried by the framework and extending longitudinally of the framework, said bed shaping means including spaced parallel downwardly extending and outwardly inclined side walls, a shaft rotatably mounted on the framework extending laterally of the framework, a mulcher assembly mounted on said shaft for engaging the top surface of the bed between the side walls of the bed shaping means, means mounted on the framework for rotating the shaft and the mulcher assembly carried thereby, a housing mounted on said framework and on the bed shaping means between the ends of the bed shaping means and substantially enclosing the upper extremity of the mulcher assembly, said housing having spaced parallel side walls extending downwardly and adjoining the side walls of the bed shaping means, said housing being provided with an opening to the rear extending upwardly from the bottom of the housing across the width of the housing, the portion of the housing defining the upper extremity of the opening being spaced a distance above the bed and the shaft, said housing including gate means, means pivotally mounting said gate means on the housing for swinging movement to and from a closed position with respect to said opening about a horizontal axis above said shaft, said gate means having a width so that it extends across the width of the entire top surface of the bed and having a length such that its lower extremity engages the top surface of the bed and is spaced a substantial distance above the lower extremities of the side walls of the bed shaping means, and means carried by the framework and engaging the gate means for yieldably urging said gate means toward said closed position to retain clods over a certain size in the housing until they are broken up by the mulcher assembly to form soil of a size which can escape from the housing under said gate means.

2. Apparatus as in claim 1 together with a bed shaper mounted on said framework and extending forwardly of said housing and below said housing.

3. Apparatus as in claim 1 wherein said mulching assemblies consist of a pair of hub-like members removably secured to said shaft, and a plurality of tines mounted on said members, said tines having portions extending laterally of the framework and being spaced so as to cover laterally the surface of the bed over which the framework travels.

4. Apparatus as in claim 1 wherein said means for holding said gate in a closed position consists of spring means yieldably holding said gate in a closed position.

5. Apparatus as in claim 2 wherein said bed shapers are provided with extensions which extend to the rear of the mulching assembly.

6. Apparatus as in claim 3 wherein said members have substantially semi-circular portions spaced laterally from each other at diametral positions in the shaft and wherein said tines are substantially L-shaped, two of said tines being mounted on each of said hub-like members and being spaced approximately 90° apart.

* * * * *